United States Patent [19]
Dunn

[11] Patent Number: 5,692,270
[45] Date of Patent: Dec. 2, 1997

[54] CHAIN LENGTH ADAPTOR TOOL

[76] Inventor: Robert J. Dunn, 11016 Lippitt Ave., Dallas, Tex. 75218-1917

[21] Appl. No.: 623,897

[22] Filed: Mar. 26, 1996

[51] Int. Cl.⁶ .............................. B66C 1/00; F16G 15/00
[52] U.S. Cl. .......................... 24/116 R; 24/346; 24/370; 59/93
[58] Field of Search ...................... 24/116 R, 346, 24/370, 573.7, 598.7, 599.9, 599.5, 599.12; 59/93

[56] References Cited

U.S. PATENT DOCUMENTS

| | | | |
|---|---|---|---|
| 287,115 | 10/1883 | Foster | 24/116 R |
| 835,421 | 11/1906 | Heidt | 59/93 |
| 1,053,054 | 2/1913 | Miller | |
| 1,157,917 | 10/1915 | Allen | |
| 1,179,951 | 4/1916 | Moore | 24/116 R |
| 1,375,724 | 4/1921 | Oponiak et al. | |
| 1,702,946 | 2/1929 | Powers et al. | 59/93 |
| 2,016,756 | 10/1935 | Taylor | 59/93 |
| 2,153,003 | 4/1939 | Myers et al. | 24/116 R |
| 2,740,253 | 4/1956 | Waller | 59/85 |
| 3,041,041 | 6/1962 | Weldon | 24/116 R |
| 3,374,620 | 3/1968 | Gower | 59/93 |
| 3,424,219 | 1/1969 | Gower | 59/93 |
| 3,747,971 | 7/1973 | Yake | 294/82 R |
| 3,797,229 | 3/1974 | Rueff et al. | 59/93 |
| 4,273,371 | 6/1981 | Behnke et al. | 59/93 |
| 4,763,489 | 8/1988 | Strong | 63/4 |
| 5,173,998 | 12/1992 | Mackenzie | 24/273 |

*Primary Examiner*—Victor N. Sakran
*Attorney, Agent, or Firm*—Sidley & Austin

[57] ABSTRACT

Devices and methods for effectively shortening the length of a chain or modifying the end hook arrangement of a chain are provided.

10 Claims, 3 Drawing Sheets

CHAIN LENGTH ADAPTOR TOOL

TECHNICAL FIELD OF THE INVENTION

This invention relates to devices used to effectively shorten the length of a chain and/or to change the end hook arrangements on a chain.

BACKGROUND OF THE INVENTION

Chains have a number of applications including towing, lifting, and restraining loads in a wide variety of industries such as construction, automotive repair, and shipping and transportation. Conventionally, chains consist of a series of closed oval links interlocked at right angles to each other having a generally "J" shaped hook at one end or a generally "J" shaped hook at both ends. The types of hooks used with chains include both open hooks ("slip hooks") or closed, grab-type hooks ("grab hooks"). Slip hooks have a relatively large throat through which the entire chain can readily slide. Grab hooks, on the other hand, have a restricted throat that will accept and hold a chain link from the narrow edge with little clearance so as to prohibit the adjacent links, which are more or less at right angles to the "held" link, to slide through. Thus, the chain is grabbed or held by the grab hook.

A recurring problem with standard chains is that they are seldom the correct length for the job at hand. That is, they are often longer than that which is actually needed to accomplish a particular task. Furthermore, because the traditional slip hooks are incapable of grabbing onto any link of a chain and grab hooks have only one "end," they are incapable of engaging two non-adjacent links of a chain so as to effectively shorten it. Accordingly, the surplus length of a typical chain having the generally "J" shaped hooks described above must either be left too long and unrestrained, wrapped around the work to which it is attached, tied in a knot, or otherwise restrained.

These makeshift efforts to "shorten" the chain are rendered obsolete by the present invention—a generally "S" shaped, double-ended grab hook which, in a preferred embodiment, engages two points or links on a chain thereby creating a loop of unneeded links between the two points. The result is an effectively shorter chain. In a preferred embodiment, to prevent the double-ended grab hook from being dislodged during periods when the chain is slack, eyelets on the outside of each hook may be provided so that the device can be secured to the chain using, e.g., wire.

SUMMARY OF THE INVENTION

An apparatus for effectively modifying the length of a chain having oppositely disposed grab hooks is disclosed.

In a preferred embodiment, the apparatus is provided with one or more eyelets for securing the chain to the apparatus.

In another embodiment, the apparatus is provided with means to adjust the length of the chain in increments other than the length of a chain link.

In still another embodiment, the invention relates to a method for effectively modifying the length of a chain.

Also disclosed is an apparatus having a grab hook oppositely disposed from a slip hook.

In a preferred embodiment of the apparatus having a grab hook oppositely disposed from a slip hook, the apparatus is provided with one or more eyelets for securing the chain to the apparatus. Also disclosed is a method for changing the end hook arrangement of a chain.

BRIEF DESCRIPTION OF THE DRAWINGS

The present invention may be more readily understood by reference to the following drawings wherein like numbers refer to like parts. These figures are illustrative only and are not intended to limit the scope of the present invention in any manner.

DETAILED DESCRIPTION

Figure 1:
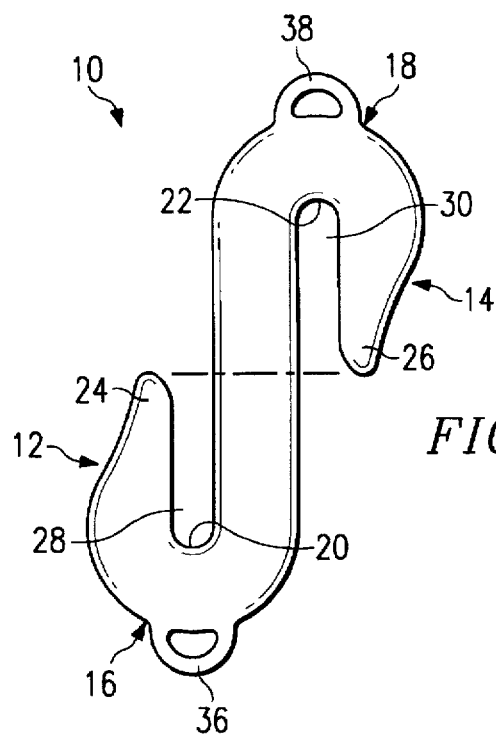
FIG. 1 is an illustration of a double-ended grab hook having grab hooks of equal sizes.
Figure 2:
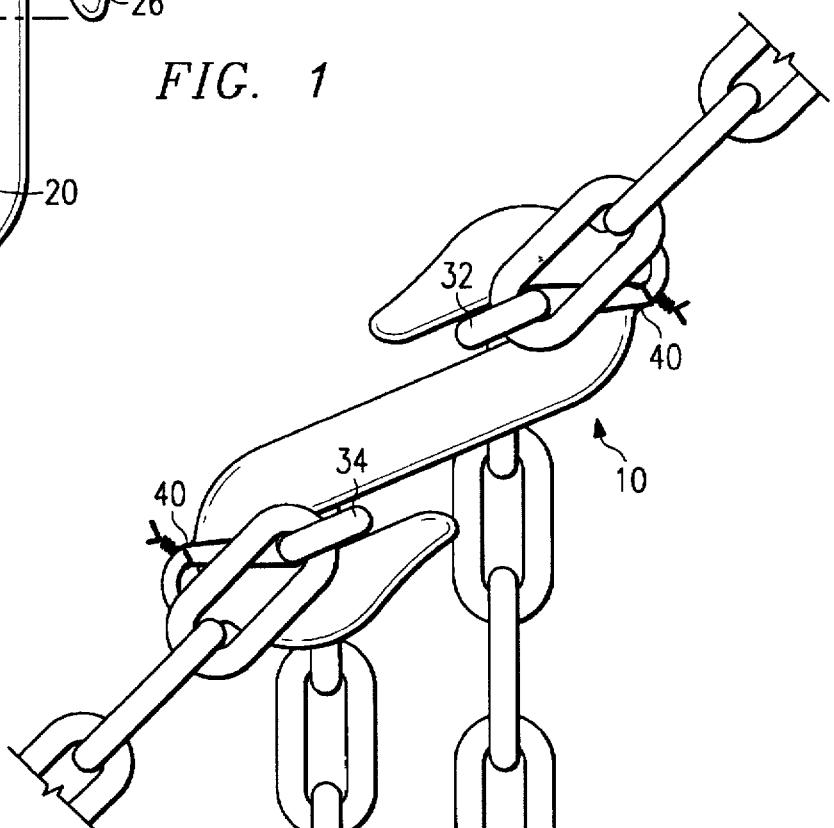
FIG. 2 is an illustration of the manner in which the double-ended grab hook attaches to a chain to thereby shorten it.

Referring to FIG. 1, the double-ended grab hook 10 generally having an "S" shaped configuration has a pair of oppositely disposed grab hooks 12 and 14. Each grab hook 12 and 14 has an outside arc 16 and 18, an inside arc 20 and 22, and a hook end 24 and 26, respectively. Hook ends 24 and 26 define slots 28 and 30 into which a chain link 32 and 34 is inserted during operation (FIG. 2).

The only dimensions of critical importance are the dimensions of the slots 28 and 30. The slots 28 and 30 must be sufficiently large to slip over and hold any one of the links of a chain from the narrow edge, i.e., in a sideways position, and yet be sufficiently narrow to prevent either of the two adjacent links from slipping or sliding through the slot as illustrated in FIG. 2.

In the preferred embodiment illustrated in FIG. 1, retaining eyelets 36 and 38 are provided on the outside arc 16 and 18 of each hook end 24 and 26. The eyelets 36 and 38 are used to hold the device in place whenever the chain becomes slack. This can be done, e.g., by using a wire 40 (FIG. 2) to attach the hooked link into the double-ended grab hook 10.

Figure 3:
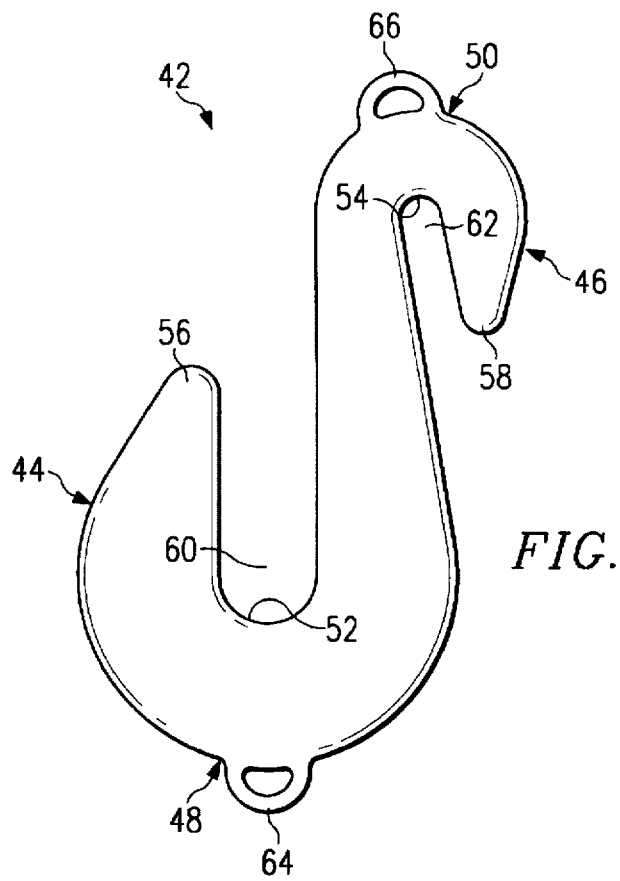
FIG. 3 is an illustration of a double ended grab hook having grab hooks of unequal sizes.

In another embodiment, illustrated in FIG. 3, the present invention can be used to link two chains of different sizes together. As is shown, the double-ended grab hook 42 generally having an "S" shaped configuration has a pair of oppositely disposed grab hooks 44 and 46. Each grab hook 44 and 46 has an outside arc 48 and 50, an inside arc 52 and 54, and a hook end 56 and 58, respectively. Hook ends 56 and 58 define slots 60 and 62 into which a chain link is inserted. However, rather than having grab hooks 44 and 46 and therefore slots 60 and 62 of equal size, each of the grab hooks 44 and 46 differs in size such that each can grab and hold onto a different size chain. Preferably, retaining eyelets 64 and 66 are provided on the outside arc 48 and 50 of the hook ends 56 and 58.

Figure 4:
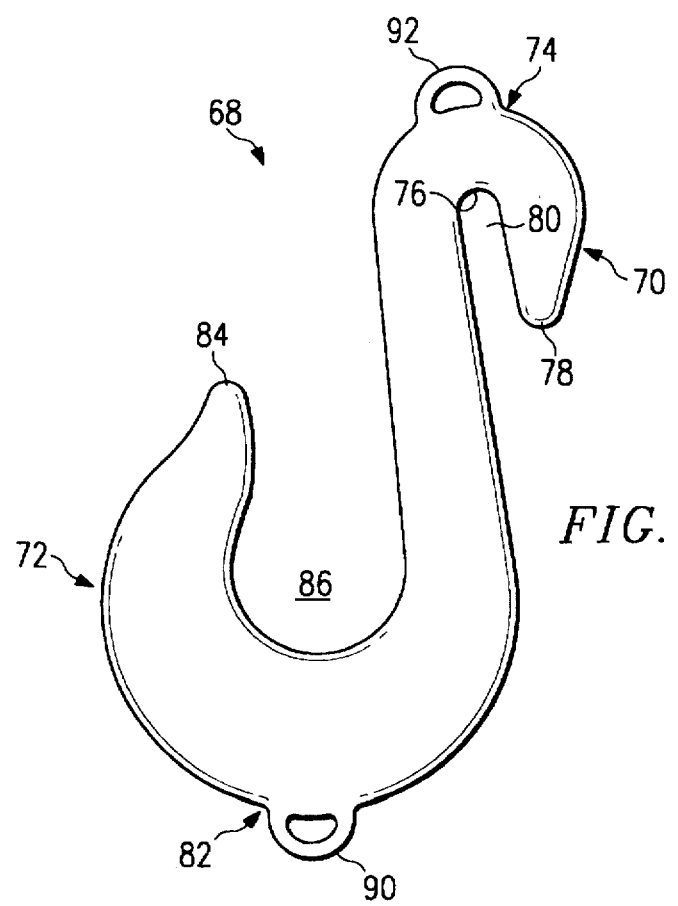
FIG. 4 is an illustration of a double-ended hook having a grab hook at one end and a slip hook at the other end.
Figure 5:
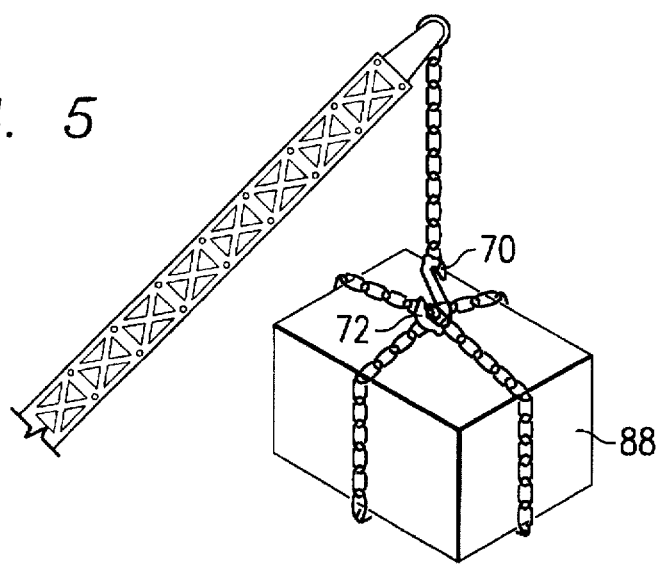
FIG. 5 is an illustration of the manner in which the double-ended hook having a grab hook at one end and a slip hook at the other end is utilized.

In still another embodiment, as illustrated in FIG. 4, a generally "S" shaped double-ended hook 68 having a grab hook 70 oppositely disposed from a slip hook 72 is provided. The grab hook 70 has an outside arc 74, an inside arc 76 and includes a hook end 78 defining a slot 80 into which a chain link is inserted. The slip hook 72 also has an outside arc 82 and includes a hook end 84 defining an opening 86 through which the entire chain can pass. As illustrated in FIG. 5, such a double-ended hook provides for the attachment of the device anywhere along the length of a first chain by means of the grab hook 70 such that the slip hook 72 can be used to move a load or object(s) 88 otherwise constrained by the chain. Preferably, retaining eyelets 90 and 92 are provided on the outside arc 82 and 74 of the hook ends 84 and 78.

In each of these embodiments, the device can be manufactured so as to fit any size of chain. In addition, while the oval link chain as illustrated in FIG. 2 is the preferred form for use with the grab-hooks of the present invention, other types of link chains may also be used if desired.

Figure 6:
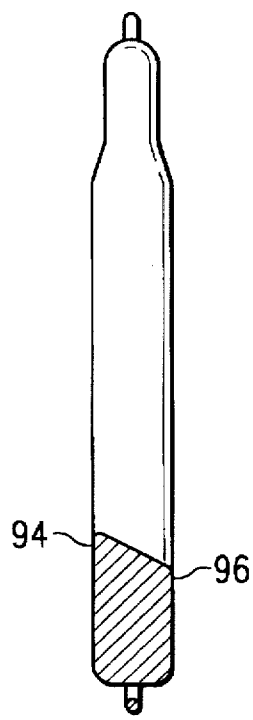
FIG. 6 is a cross sectional view of a grab hook that has been modified by beveling the inside arc of the slot to provide for adjustments in chain length other than as an integer of the length of a chain link.
Figure 7:
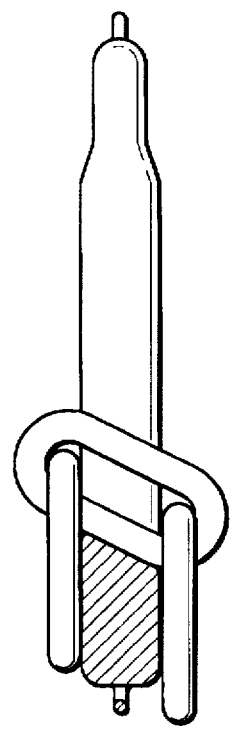
FIG. 7 is a cross sectional view of a modified grab hook illustrating the manner in which grab hooks having a modified slot allow for adjustments of chain length other than as an integer of the length of a chain link.

Furthermore, the grab hook in each of these embodiments can be modified as illustrated in FIG. 6 by beveling the inside arc so that one side 94 of the inside arc is higher than the other side 96 of the inside arc. Because one side 94 of the inside arc is higher than the other side 96, the minimal length of the chain needed for insertion of a chain link into the slot defined by a grab hook will depend on which side of the grab hook the chain is laid through as illustrated in FIG. 7. In this manner changes can be made in the chain length to which the grab hook is attached in increments that are something other than an integer of the full length of the chain link.

The apparatus of the present invention can also be used to change the end hook arrangement of a chain. For example, a double ended grab hook can be attached near the end of a chain terminating in a grab hook of one size to change it into a chain terminating in a grab hook of a different size. Likewise, an apparatus having a grab hook oppositely disposed from a slip hook can be attached near the end of a chain terminating in a grab hook to change it into a chain terminating in a slip hook.

What is claimed is:

1. A nonarticulated apparatus for modifying the length of a chain comprising a first grab hook and a second grab hook; said first grab hook oppositely disposed from said second grab hook, said first and second grab hooks together having a generally "S" shaped configuration, each of said first and second grab hooks comprising an outside arc, an inside arc and a hook end defining a slot into which a chain link can be inserted wherein at least one of said first and second grab hooks further comprises a beveled inside arc.

2. The apparatus of claim 1 wherein the slot of the first grab hook is capable of holding a first link from a first chain of a first size and the slot of the second grab hook is capable of holding a second link from a second chain of a second size different from that of the first size.

3. The apparatus of claim 2 further comprising at least one eyelet.

4. The apparatus of claim 1 further comprising at least one eyelet.

5. An apparatus comprising a first and second hook; said first and second hooks oppositely disposed from each other and having a generally "S" shaped configuration, wherein said first hook is grab hook comprising an outside arc, an inside arc and a hook end defining a slot into which a chain link is inserted and said second hook is a slip hook comprising an outside arc and a hook end defining an opening through which an entire chain can pass.

6. The apparatus of claim 5 further comprising at least one eyelet.

7. The apparatus of claim 5 wherein the grab hook further comprises a beveled inside arc.

8. A method for modifying the length of a chain comprising attaching to nonadjacent links of said chain a nonarticulated apparatus comprising a first grab hook and a second grab hook; said first grab hook oppositely disposed from said second grab hook, said first and second grab hooks together having a generally "S" shaped configuration, each of said first and second grab hooks comprising an outside arc, an inside arc and a hook end defining a slot into which a chain link can be inserted wherein at least one of said first and second grab hooks further comprises a beveled inside arc.

9. A method for modifying the end hook arrangement of a chain comprising attaching to said chain a nonarticulated apparatus comprising a first grab hook and a second grab hook; said first grab hook oppositely disposed from said second grab hook, said first and second grab hooks together having a generally "S" shaped configuration, each of said first and second grab hooks comprising an outside arc, an inside arc and a hook end defining a slot into which a chain link can be inserted wherein at least one of said first and second grab hooks further comprises a beveled inside arc.

10. A method of modifying the end hook arrangement of a chain comprising attaching to said chain an apparatus comprising a first and second hook; said first and second hooks oppositely disposed from each other and having a generally "S" shaped configuration, wherein said first hook is grab hook comprising an outside arc, an inside arc and a hook end defining a slot into which a chain link is inserted and said second hook is a slip hook comprising an outside arc and a hook end defining an opening through which an entire chain can pass.

* * * * *